United States Patent
Bar Eliyahu et al.

(10) Patent No.: US 11,983,489 B1
(45) Date of Patent: May 14, 2024

(54) EXTRACTIVE SUMMARY GENERATION BY ABSTRACTIVE TRAINED MODEL

(71) Applicant: Intuit Inc., Mountain View, CA (US)

(72) Inventors: Natalie Bar Eliyahu, Petah Tikva (IL); Ido Farhi, Tel Aviv (IL); Adi Shalev, Herzliya (IL); Oren Dar, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/213,808

(22) Filed: Jun. 23, 2023

(51) Int. Cl.
*G06F 40/166* (2020.01)
*G06F 40/279* (2020.01)

(52) U.S. Cl.
CPC .......... *G06F 40/166* (2020.01); *G06F 40/279* (2020.01)

(58) Field of Classification Search
CPC .............................. G06F 40/166; G06F 40/279
See application file for complete search history.

(56) References Cited

U.S. PATENT DOCUMENTS

| | | | |
|---|---|---|---|
| 2004/0225667 A1* | 11/2004 | Hu | G06F 16/345 |
| 2017/0124038 A1* | 5/2017 | Upadhyay | G06F 40/166 |
| 2023/0385557 A1* | 11/2023 | Sabapathy | G06F 16/345 |

OTHER PUBLICATIONS

Jain, S. et al., "Attention is not Explanation"; NAACL 2019 Long Paper: Computation and Language; Artificial Intelligence; May 2019 (16 pages). arXiv:1902.10186v3 [cs.CL].

* cited by examiner

*Primary Examiner* — Huyen X Vo
(74) *Attorney, Agent, or Firm* — Lathrop GPM LLP (57) ABSTRACT

A method and computer system are provided for generating a text summary. An input text is processed by a model that comprises a set of attention heads. The model is trained to generate abstractive summaries of text documents. A subset of the attention heads are identified. For each attention head in the subset, a portion is identified from the input text that is used to generate the abstractive summary. For each sentence of the input text, a fractional size is calculated for an intersection of the portion and the respective sentence relative to the respective sentence. A subset of the sentences is then determined, where the respective fractional size of each sentence in the subset meets a first threshold. An extractive summary of the input text is then generated from the subset of sentences.

24 Claims, 8 Drawing Sheets

Head 1: Johannes Gutenberg (1398 – 1468) was a German goldsmith and publisher who introduced printing to Europe.
The German Johannes Gutenberg introduced printing in Europe Head 2: Johannes Gutenberg (1398 – 1468) was a German goldsmith and publisher who introduced printing to Europe.
The German Johannes Gutenberg introduced printing in Europe Head 3: Johannes Gutenberg (1398 – 1468) was a German goldsmith and publisher who introduced printing to Europe.
The German Johannes Gutenberg introduced printing in Europe

EXTRACTIVE SUMMARY GENERATION BY ABSTRACTIVE TRAINED MODEL

BACKGROUND

Text summarization is a machine learning process of reducing a text document to its most important points. It is used to condense substantial amounts of text into a shorter version that conveys the same meaning. Typical machine learning models that perform text summarization include natural language processing (NLP) models, such as recurrent neural networks (RNNs), convolutional neural networks (CNNs), and long short-term memory (LSTM) networks.

Text summarization can be either extractive or abstractive. An abstractive text summary is based on the ideas and concepts presented in the text. Abstractive summaries rewrite the text in the writer's own words and offer a synopsis of the main ideas, often using a smaller number of words than the original text.

An extractive text summary is a summary that extracts key phrases and sentences from the original text. Extractive summaries are a selection of key phrases, sentences, or ideas taken directly from the original text without any changes. Extractive summaries often use more words than abstractive summaries, but they do capture the main points of the text in the order presented.

SUMMARY

In general, one or more aspects of the disclosure are directed to a method for generating a text summary. The method includes processing an input text by a model that comprises a set of attention heads. The model is trained to generate abstractive summaries of text documents. The method further includes identifying a subset of the attention heads. For each attention head in the subset, a portion is identified from the input text that is used to generate the abstractive summary. For each sentence of the input text, a fractional size is calculated for an intersection of the portion and the respective sentence relative to the respective sentence. The method additionally includes determining a subset of the sentences. The respective fractional size of each sentence in the subset meets a first threshold. The method also includes generating an extractive summary of the input text from the subset of sentences.

In general, one or more aspects of the disclosure are directed to a computer system that includes a model having a set of attention heads. The model is trained to generate abstractive summaries of text document. The system also includes an application executing on one or more servers. The application is configured for processing an input text by the model. The application is further configured for identifying a subset of the attention heads. For each attention head in the subset, a portion is identified from the input text that is used to generate the abstractive summary. For each sentence of the input text, a fractional size is calculated for an intersection of the portion and the respective sentence relative to the respective sentence. The application is additionally configured for determining a subset of the sentences. The respective fractional size of each sentence in the subset meets a first threshold. The application is also configured for generating an extractive summary of the input text from the subset of sentences.

In general, one or more aspects of the disclosure are directed to a computer system comprising an application executing on one or more client devices. The computer system is configured for sending an input text to a server application and receiving an executive summary in a response from the server application. The server application is configured for: The application is configured for processing an input text by the model. The application is further configured for identifying a subset of the attention heads. For each attention head in the subset, a portion is identified from the input text that is used to generate the abstractive summary. For each sentence of the input text, a fractional size is calculated for an intersection of the portion and the respective sentence relative to the respective sentence. The application is additionally configured for determining a subset of the sentences. The respective fractional size of each sentence in the subset meets a first threshold. The application is also configured for generating an extractive summary of the input text from the subset of sentences.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Both extractive and abstractive text summaries are beneficial because they each provide different benefits. Extractive summaries are useful for quickly capturing the main points of a text without having to read the entire document. Abstractive summaries provide a condensed and rewritten version of the text that can be used to get an understanding of the text quickly and easily in a short amount of time. However, generating both abstractive and extractive summarizations typically requires two separate deep learning models due to differences between the datasets used to train these models and the type of annotations required for the training data.

For example, extractive summary models aim to summarize a given text by selecting and concatenating important sentences or phrases from the original text. Thus, the training data for extractive summary models typically consists of a large number of documents along with their corresponding summaries, where the summaries are simply extracts of the original documents. Extractive summarization models typically require larger datasets since they rely on sentence-level or phrase-level annotations.

On the other hand, abstractive summary models aim to generate summaries that do not necessarily contain exact phrases or sentences from the original text, but instead capture the main ideas and concepts presented in the text. As a result, the training data for abstractive summary models requires more complex annotations, such as sentence-level or token-level annotations that indicate which parts of the text are important for summarization, as well as how these parts should be combined to produce a coherent summary. Typically, abstractive summarization models can be trained with smaller datasets since the models rely on more complex annotations that capture the meaning and intent of the text.

Correlation between intuitive feature importance measures (including gradient and feature erasure approaches) and learned attention weights has generally been considered weak for recurrent encoders. Therefore, systems that utilize both abstractive and extractive summarizations have previously required inferencing two separate deep learning models By manually exploring attention heads, illustrative embodiments of the current invention are able to identify identified individual heads that consistently correlates the input and output in a manner that is semantically logical. These identified heads can then be utilized to generate a high-quality extractive summary from an abstractive model trained from an abstractive data set.

Thus, the illustrative embodiments are capable of generating two types of summaries while only requiring the processing footprint for a single model. Considering these models tend to be quite large and computationally expensive to inference, the computational savings could be significant over two separate models. Furthermore, the illustrative embodiments provide an innovative way to generate extractive summarizations with high accuracy by utilizing all available training data where only abstractive summarizations and/or data sets are available.

Figure 1:
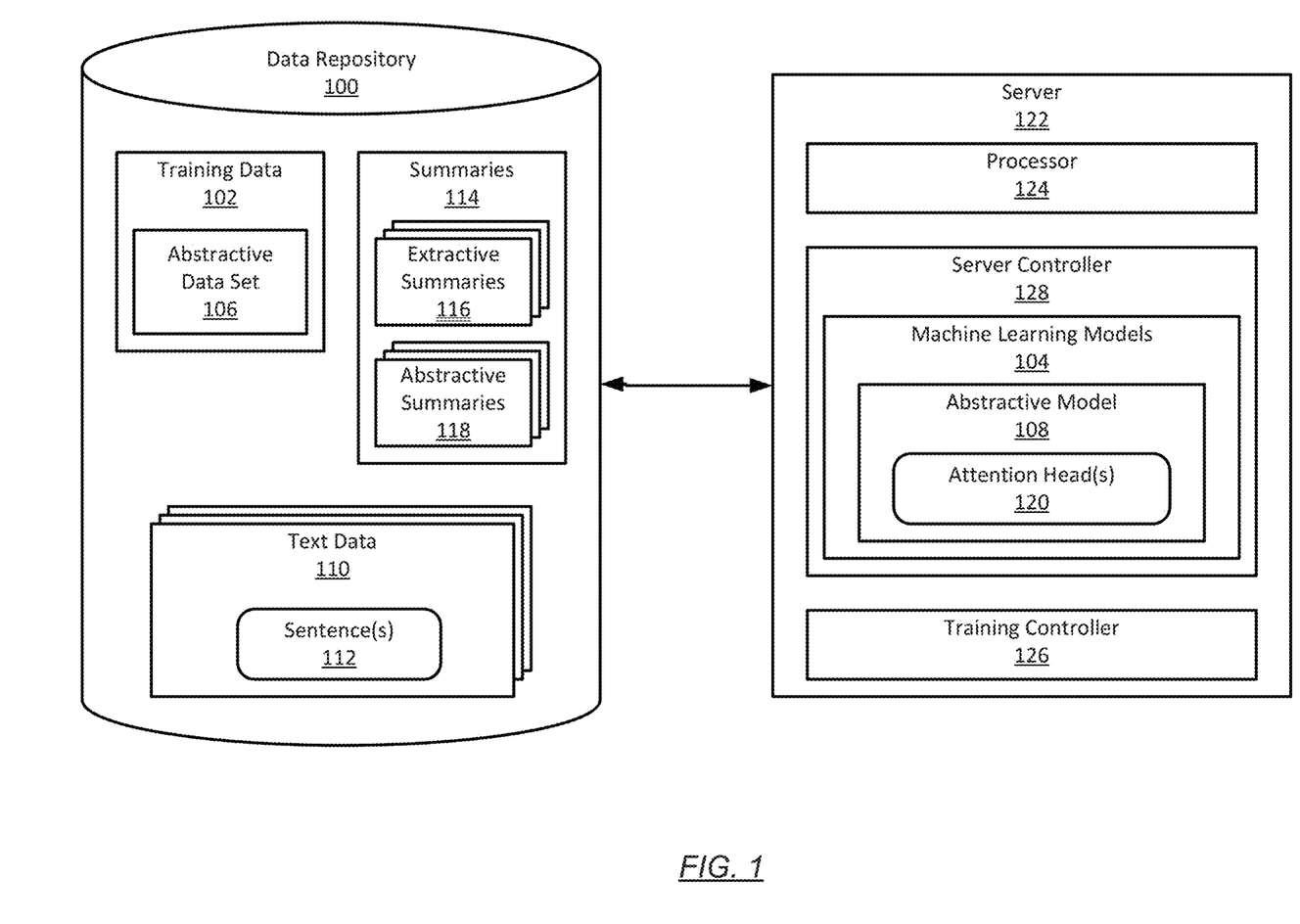
FIG. 1 shows a computing system in accordance with one or more embodiments of the invention.

Turning to FIG. 1, a computing system is shown in accordance with one or more embodiments. The computing system includes data repository (100). In one or more embodiments of the invention, the data repository (100) is any type of storage unit and/or device (e.g., a file system, database, data structure, or any other storage mechanism) for storing data. Further, the data repository (100) may include multiple different, potentially heterogeneous, storage units and/or devices.

The data repository (100) stores training data (102). Training data (102) is a set of labeled examples that are used to train a model comma such as one of machine learning models (104). Training data (102) consists of input data and the corresponding expected output, which are is used to teach a model mapping between input features to the corresponding output labels.

As illustrated, the training data (102) includes one or more abstractive dataset(s) (106). As used herein and as typically defined in the art, a dataset is a collection of organized data with a defined structure or format, for the purpose of facilitating analysis, processing, or other types of manipulation. The data in a dataset may be of various types, including numerical, categorical, textual, or multimedia data.

Abstractive dataset(s) (106) is a data set used to train abstractive model (108). Abstractive dataset(s) (106) include one or more annotations, such as sentence-level or token-level annotations that indicate which parts of the data are important for summarization. These annotations can include, for example, summary text, entity labels, part-of-speech tags, dependency parse trees, and/or coreference resolutions, as well as other annotations that may be suitable for labeling the data. Abstractive dataset(s) (106) may be unsuitable for training extractive models. Likewise, an extractive dataset may be unsuitable for training abstractive model (108).

The data repository (100) stores text data (110). As used herein, "text data" refers to any type of information that is represented in a textual format, including but not limited to natural language text, numerical data, and symbols. Text data can be found in a variety of sources, including digital documents such as emails, PDFs, and web pages, as well as social media platforms, chat logs, and messaging apps. Text data can be extracted from these sources using a variety of techniques, such as web scraping, API calls, and data mining algorithms. The extracted data can then be processed and analyzed using natural language processing (NLP) techniques to gain insights and make informed decisions.

In some embodiments, text data is representation of spoken words extracted from an audio transcription into a written format. This type of text data can be generated through automatic speech recognition (ASR) technology, which converts spoken words into text, often accompanied by metadata such as the speaker's identity, date, time, and duration of the call.

The text data (110) includes or more sentence(s) (112). The sentences (112) are text strings extracted from the text data (110). Each sentence of the sentences (112) may include multiple words that each may include multiple characters. Characters can be a set of standardized ASCIIS (American Standard Code for Information Interchange) characters that represent letters, numbers, symbols, and control codes in digital communications. Each sentence may be stored as a string of the text characters. In one embodiment, the sentences (112) are stored in a list that maintains the order of the sentences (112) from the text data (110).

The data repository (100) stores summaries (114). Summaries (ABC) are summaries of text data (110) that are automatically generated using machine learning models (104). Summaries (114) can include both extractive summaries (116) and abstractive summaries (118).

Abstractive summaries (118) are one or more original sentences or phrases by machine learning models (104) on a semantic understanding of the text data (110). Abstractive summaries (118) synthesize information from the original text to produce a new summary that is written differently from the sentences (112) of text data (110). Abstractive summaries may be useful in situations where the goal is to produce a summary that concisely conveys the sentiment and key aspects of the original text, but is written in natural language that is different from the original text, such as product reviews or social media analysis. In some embodiments, abstractive summaries (118) are generated using abstractive model (108).

Extractive summaries (116) are one or more sentences or phrases identified and extracted from text data (110) in their original form. The sentences and phrases of the extractive summaries (116) are selected from sentences (112) by machine learning models (104) based on the relevance to the overall meaning of the text data (110). Extractive summaries may be useful when tasks require a quick overview of the most important information in a given text, such as news summarization, legal and medical fields, where extracting important information from large documents can be time-consuming. In some embodiments, extractive summaries (116) are generated using a selected one of attention head(s) (120) of abstractive model (108). For example, extractive summaries, (116) can be a serial concatenation of selected ones of sentence(s) (112) utilized by a selected one of attention head(s) (120) when generating abstractive summaries (118).

Figure 6A:
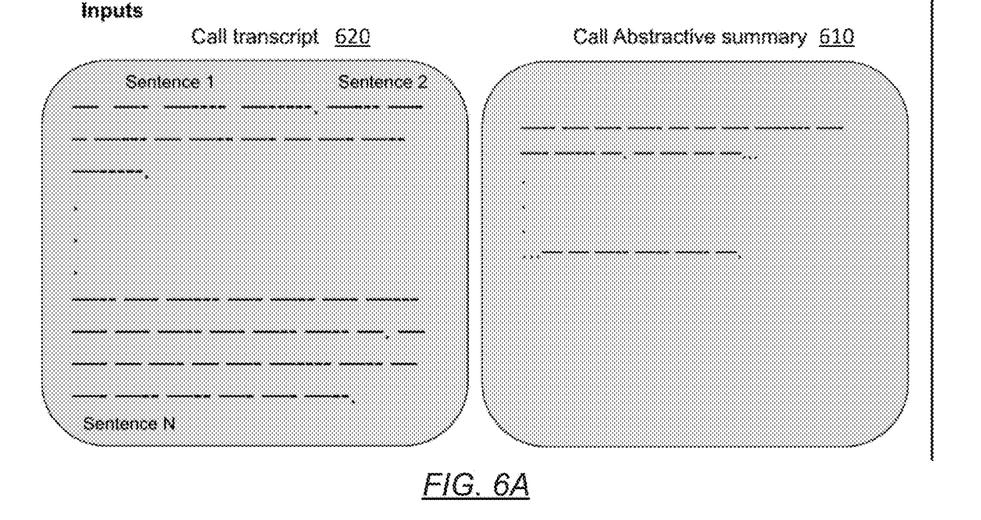
FIGS. 6A, 6B, 6C, and 6D, show a series of process steps for generating an extractive summary are conceptually shown according to illustrative embodiments.

The system shown in FIG. 1 may include a server (122). The server (122) is one or more computers, possibly communicating in a distributed computing environment. Thus, the server (122) includes one or more processors, such as processor (124). The processor (124) is hardware, or a virtual machine programmed to execute one or more controllers and/or software applications. The processor (124) may be, for example, the computer processor(s) (602) of FIG. 6A.

The server (122) also includes a training controller (126). The training controller (126) is one or more applications or application specific hardware programmed to train one or more of the machine learning models (104).

The server (122) also includes a server controller (128). The server controller (128) is one or more applications or application specific hardware programmed to control operation of the machine learning models (104).

The machine learning models (104) is a set of hardware and software components that may operate as part of the server controller (128). The machine learning model (104) process text data (110) to generate the summaries (114). In one embodiment, the machine learning model (104) may include one or more artificial neural networks with one or more layers. For example, the machine learning model(s) (104) may include a recurrent neural network, a long-short term memory (LSTM), a gated recurrent unit (GRU), a transformer neural network, a fully connected network, etc.

Machine Learning models (104) include abstractive model (108). Abstractive model (108) is a machine learning model trained from Abstractive data set (106). Once trained, abstractive model (108) generates abstractive summaries. (114) from text data (11'0). In some embodiments, abstractive model (108) is a transformer architecture that includes one or more attention head(s) (120).

Figure 2:
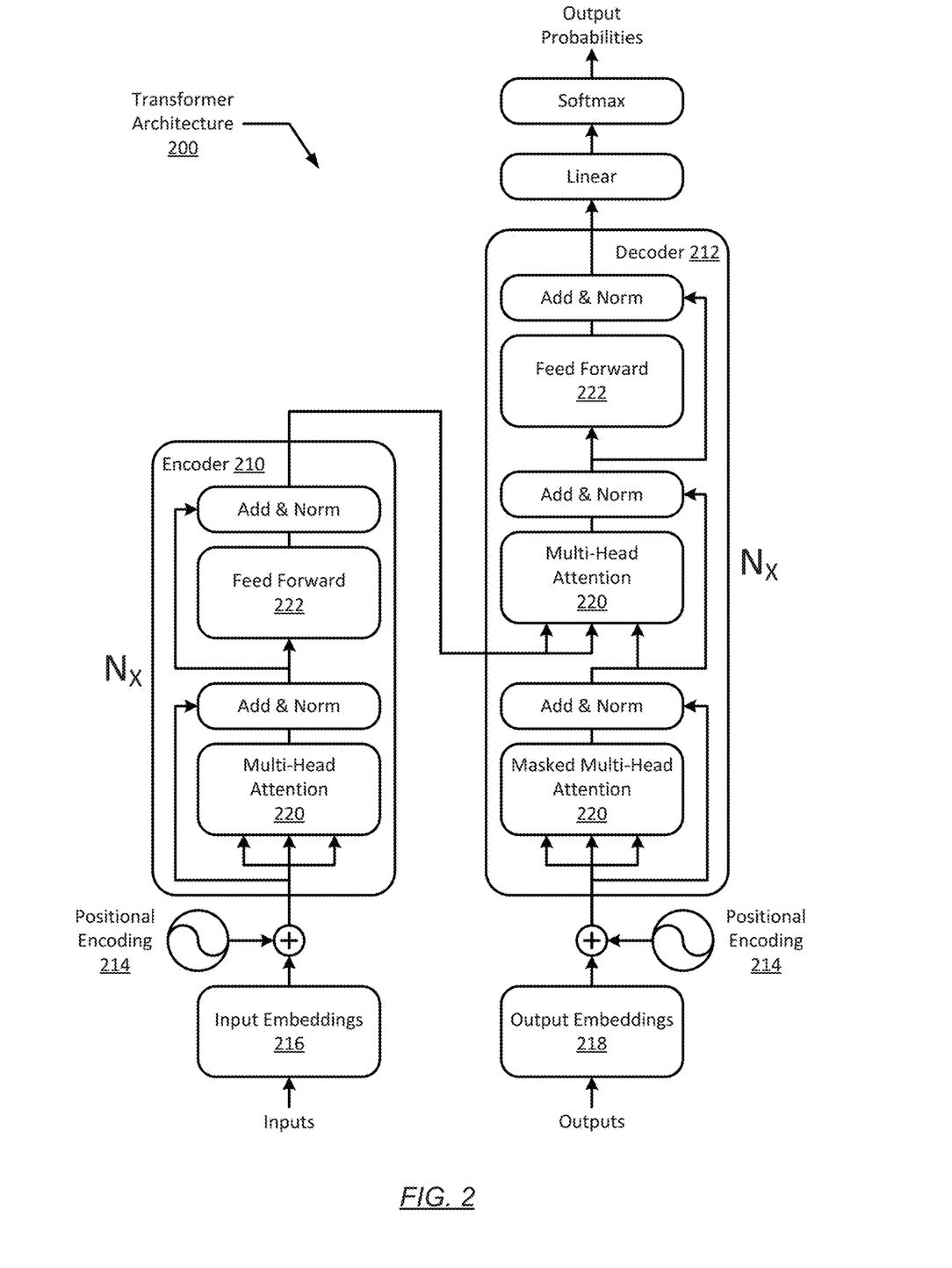
FIG. 2 shows a transformer architecture in accordance with one or more embodiments of the invention.

As further described in FIG. 2, attention head(s) (120) are computational component that allow the model to selectively focus on various parts of the input sequence of text data. (110) during processing. Each attention head is responsible for computing a separate attention score between each position in the sequence and all other positions. The outputs of the attention heads are then combined to produce a single attention matrix that is used to weight the input sequence during processing. In other words, attention heads enable the model to dynamically address various parts of the input sequence based on their relevance to the task at hand. By using multiple attention heads, the model can learn to address various aspects of the input sequence in parallel, allowing it to capture a wider range of relationships and dependencies between sentences (112).

FIG. 2 illustrates a transformer architecture. Transformer architecture (200) can be used to implement the abstractive model (108) of FIG. 1. The transformer, in comparison to recurrent neural networks (RNN), is less prone to suffering from the vanishing gradient problem which is characteristic of networks using gradient-based optimization techniques (i.e., reduced efficacy due to the earlier layers learning being slower than the learning of later layers due to temporal information decay).

The transformer architecture (200) relies on a self-attention (intra-attention) mechanism, thereby eliminating the recurrent operations computed in Recurrent Neural Networks, which may be used to compute the latent space representation of both the encoder (210) and decoder (212) sides. Positional encoding (214) is added to the input and output embeddings (216, 218) with the absence of recurrence. The positional information, which is similar to a time-step in a recurrent network, provides the Transformer network with the order of input and output sequences. A combination of absolute positional encoding and relative positional information may be used. Input from the previously generated symbol is auto-regressively used by the model for the next prediction which is organized as a stack of encoder-decoder networks. In addition, uniform layers compose both the encoder (210) and decoder (212), and each layer is built of two sublayers: a multi-head self-attention layer (220) and a position-wise feed-forward network (FFN) layer (222). The multi-head sub-layer (220) enables the use of multiple attention functions with an equivalent cost of utilizing attention, while the FFN sub-layer (222) uses a fully connected network to process the attention sublayers. The FFN applies multiple linear transformations on each position and a Rectified Linear Unit (ReLU) which extends the self-attention mechanism to efficiently consider representations of the relative positioning (i.e., distances between sequence elements).

Figure 3A:
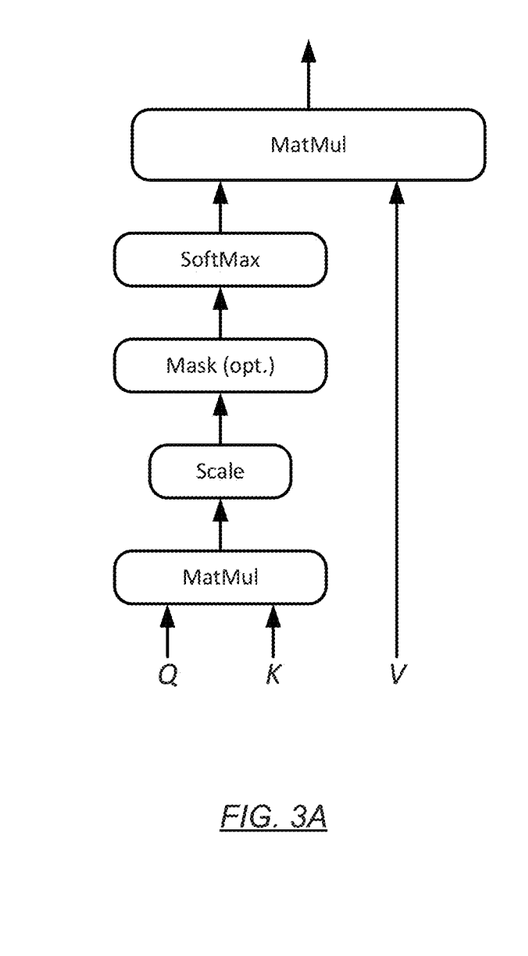
FIG. 3A and FIG. 3B show an attention head mechanism in accordance with one or more embodiments of the invention.
Figure 3B:
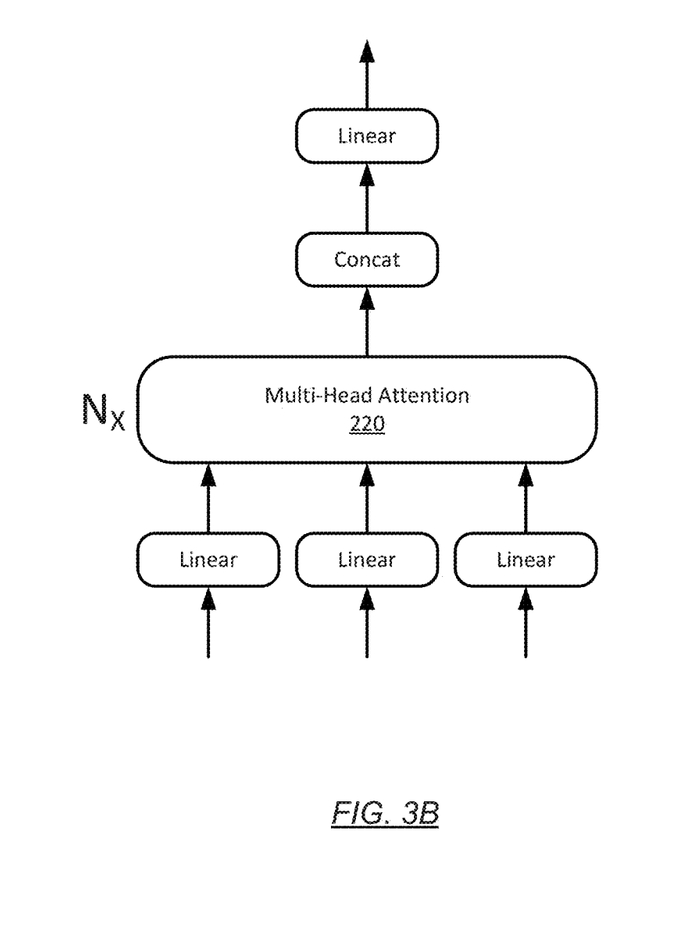

FIG. 3A and FIG. 3B illustrate a multi-head attention head architecture in accordance with one or more embodiments. Multiple attention heads (FIG. 3A) can be combined to form the multihead attention (FIG. 3B) that can be implemented in the transformer architecture (200) of FIG. 2.

As illustrated in FIG. 3A, an attention function can be described as mapping a query and a set of key-value pairs to an output, where the query, keys, values, and output are all vectors. The attention head is initialized with a set of weights that will be learned during training to assign different weights to various parts of the input sequence.

The attention head computes three vectors for each position in the input sequence: query (Q), key (K), and value (V). In "encoder-decoder attention" layers, the queries come from the previous decoder layer, and the memory keys and values come from the output of the encoder. The query (Q) vector represents the position being considered, while the key (K) and value (V) vectors represent all other positions in the sequence. These vectors are obtained by multiplying the input sequence with learnable weight matrices, which are unique for each of the query, key, and value vectors. The queries, keys, and values are packed together into matrices, which provide input to the various linear functions. This allows every position in the decoder to attend over all positions in the input sequence.

A similarity score is calculated between the query vector and all key vectors in the sequence. The attention functions can be multiplicative, by computing the dot product between the query vector and each key vector. Alternatively, an additive function can be used, wherein the compatibility function may utilize a feed-forward network with a single hidden layer. The resulting scores can be normalized using a scaling factor.

For each position in the sequence, an attention score is computed by applying the SoftMax function to the obtained similarity scores. The attention scores represent the weights assigned to each position in the sequence, indicating how much attention should be given to that position.

A weighted sum of the value vectors is then calculated using the attention scores. This summation results in a single output vector, which represents the weighted combination of all value vectors in the sequence. In other words, the output is computed as a weighted sum of the values, where the weight assigned to each value is computed by a compatibility function of the query with the corresponding key.

Multi-head attention (FIG. 3B) allows the model to jointly address information from different representation subspaces at various positions. The queries, keys and values are projected h times with different, learned linear projections according to matrices dimensions. The attention function is performed in parallel on each of these projected versions of queries, keys, and values, yielding dv-dimensional output values. The dimensional outputs are concatenated and once again projected, resulting in the final values. Due to the reduced dimension of each head, the total computational cost of the multi-head attention is similar to that of single-head attention with full dimensionality.

While FIGS. 1-3 show a configuration of components, other configurations may be used without departing from the scope of the invention. For example, various components may be combined to create a single component. As another example, the functionality performed by a single component may be performed by two or more components.

Figure 4:
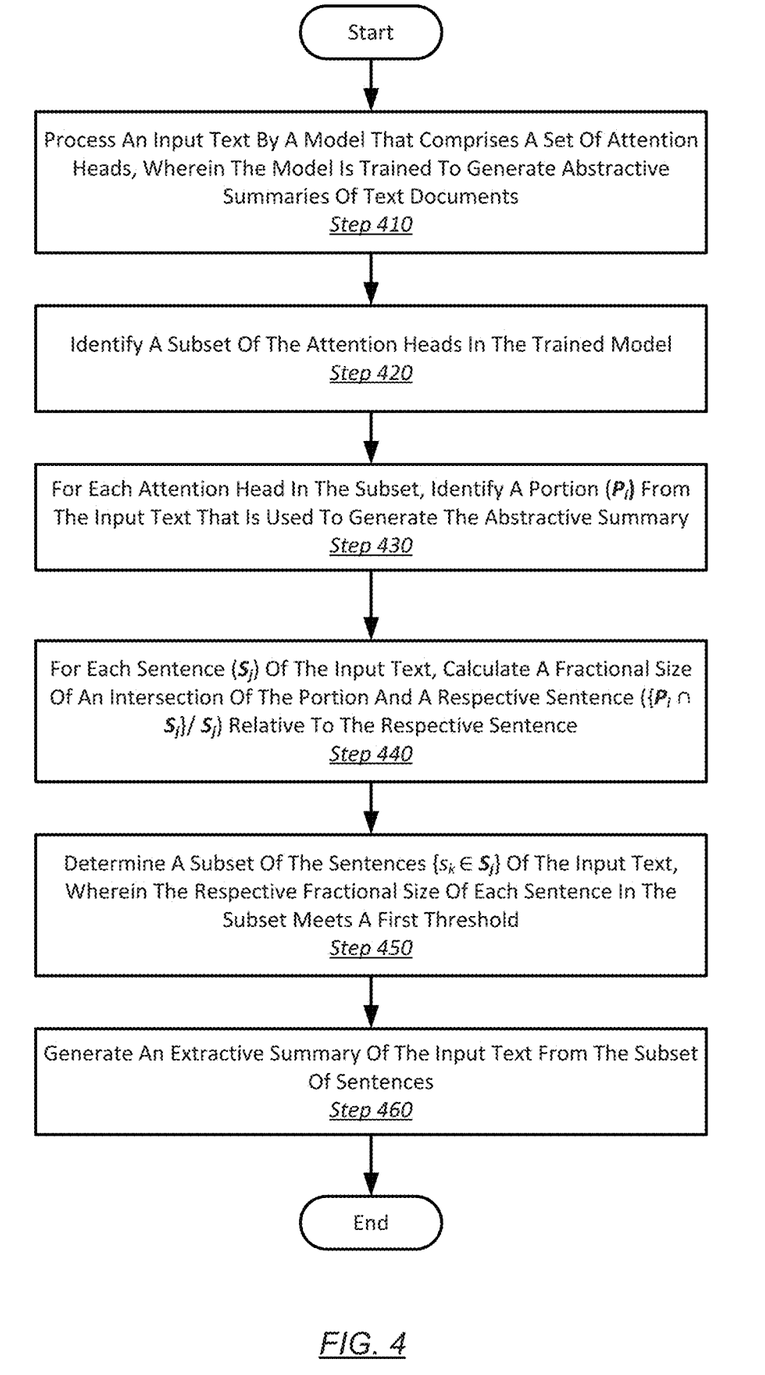
FIG. 4 shows a flowchart for generating an extractive summary of text data is shown according to one or more illustrative embodiments.

Turning to FIG. 4, a flowchart for generating an extractive summary of text data is shown according to one or more illustrative embodiments. The process of FIG. 4 can be implemented in the systems and components of FIGS. 1-3 to generate an extractive summary, such as extractive summaries (116) of FIG. 1.

At step 410, an input text is processed by a model that comprises a set of attention heads. In some embodiments, the attention heads can be the attention head of a transformer architecture, such as attention heads illustrated in FIGS. 3A and 3B.

In some embodiments, the model has been trained using a dataset that has been curated for abstractive summary generation. Once trained, the model can generate abstractive summaries of text documents.

Training can be performed using known methods for preprocessing, optimization, and evaluation. During preprocessing, text data is tokenized into smaller units, such as words or subwords, and cleaned to remove any unnecessary elements. Text and summary pairs are aligned so that the model can learn to generate a summary from the original text. The model is trained on the preprocessed dataset by optimizing the weights to minimize a loss function that measures the difference between the model-generated summary and the target summary. During training, hyperparameters such as learning rate, batch size, and regularization techniques are optimized. The model's performance is evaluated on a held-out test set, and may be further tuned to optimize results.

The model is trained using an abstractive data set, such as abstractive data set (106) of FIG. 1. As mentioned above, a data structure that is suitable for training and attractive model may not be suitable for training an extractive model. Abstractive models generate a summary by understanding the input text and generating a new summary that may not be present in the original text. Therefore, the preprocessing for an abstractive model needs to include more detailed information about the input text and the summary to enable the model to learn how to generate novel summaries. Preprocessing such a data set involves tokenizing the input text and summary into subword units and then converting those tokens into numerical vectors that can be used as input to the model. Training the abstractive model may also a human generated summary of the input text, which is then processed using similar tokenization and vectorization techniques as the input text.

At step 420, a subset of the attention heads are identified. For example, for each attention head, sentences that were used by the attention head to generate the abstractive summary are identified from the text. Individual attention heads attention heads are examined to find one or more heads that correlate abstractive summary to the respective part of the input text in a manner that is semantically logical.

In some embodiments, the identification is performed manually for each attention head, with a user inspecting mappings between sentences of the input data and the abstractive summary. In some embodiments, the subset of the attention heads can be automatically identified based on weights applied during training of the model. For example, during training of the model, a respective weight applied to each attention head is identified. An attention head can then be identified (e.g., flagged, labeled, etc.) as a member of the subset when the respective weight meets a threshold value for similarity.

Collectively, steps 430-450 describe a process for identifying relevant sentences from the input text.

At step 430, for each attention head in the subset, a portion (Pi) of the input text is identifying that is used by the respective head to generate the abstractive summary. The portion (Pi) includes each word in the input text that was used by the respective head in the subset.

At step 440, for each sentence (Sj) of the input text, calculating a fractional size of an intersection of the portion and the respective sentence relative to the respective sentence. In other words, the fractional size of the intersection can be calculated as a percentage of words in respective sentence (Sj) that appear in the portion (Pi) as illustrated in Equation 1.

$$F = \{P_i \cap S_j\} / S_j \qquad \text{Eq. 1}$$

Wherein:
$P_i$ is a portion from the input text; and
$S_j$ is a sentence of the input text data.

At step 450, the process determines a subset ($s_k$) of the sentences ($S_j$). The subset can be defined as wherein the respective fractional size F of each sentence in the subset meets a threshold; as illustrated in Equation 2.

$$\{s_k \in S_j\} \qquad \text{Eq. 2}$$

Wherein:
$s_k$ is a subset of the sentences $S_j$.

At step 460, an extractive summary of the input text this generated from the subset of sentences, with the process terminating thereafter. In some embodiments, the extractive summary can be generated by serially concatenating the subset ($s_k$) of sentences ($S_j$) identified from the input text.

In some embodiments, the process may further comprise generating an abstractive summary of the input text. Both the extractive summary and the abstract of summary are generated from a single model that was trained from an abstractive data set. Both the abstractive summary and the extractive summary can be Associated with the original text data when stored in a data repository, In a particular use case, the input text is a transcription of a customer service call. the extractive summary comprises one or more sentences extracted from the transcription. Once generated, both the abstractive summary and the extractive summary can be stored and associated with the transcription in a quality assurance system for training of customer service agents.

While the various steps in this flowchart are presented and described sequentially, at least some of the steps may be executed in different orders, may be combined, or omitted, and at least some of the steps may be executed in parallel. Furthermore, the steps may be performed actively or passively.

The following example is for explanatory purposes only and not intended to limit the scope of the invention.

Figure 5:
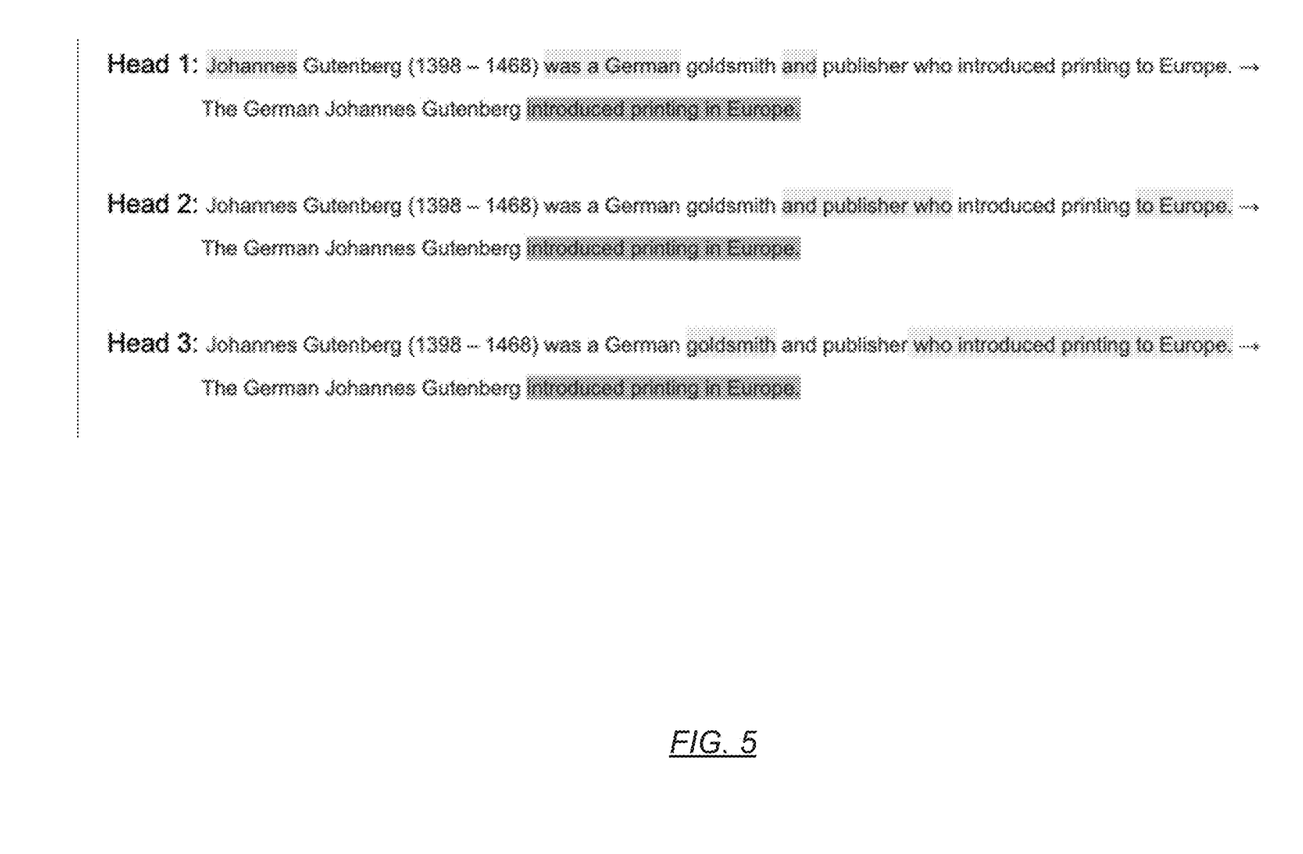
FIG. 5 shows a flowchart for generating an extractive summary of text data is shown according to one or more illustrative embodiments.

Referring now to FIG. 5, mappings up inputs to outputs are illustrated for a number of attention heads, according to illustrative embodiments. The attention heads can be attention heads (ABC) of FIGS. 1-3 described above.

Given an abstractive summarizations model, each of the attention heads in the transformer model are explored to identify which portion of the input text is used to generate the respective output text. For this purpose, attention heads can be filtered to include only those heads with attention weights above a threshold.

In this particular example, the trained model takes as input text, "Johannes Gutenberg (1398-1468) was a German goldsmith and publisher who introduced printing to Europe." From the input text, the trained model generates the abstractive summary, "The German Johannes Gutenberg introduced printing in Europe."

As illustrated, head 1 uses the input text, "Johannes", "was a German", and "and". Head 2 uses the input text, "and a publisher who", and "to Europe". Head 3 uses the input text, "goldsmith", and "who introduced printing to Europe".

Looking at the example attention heads, head 3 offers the best contextual relation to how a human user would perceive explanations. In other words, of the three attention heads, head 3 offers the most semantically logical correlation between the input text and the abstract summary. One or more heads that correlate abstractive summary to the respective part of the input text in a manner that is semantically logical. Therefore, head 3 is used to generate extractive summaries.

Referring now to FIGS. 6A-6D, a series of process steps for generating an extractive summary are conceptually shown according to illustrative embodiments. The example of FIG. 6 is provided in the context of a customer service call, wherein an abstractive summary (610) is generated from a call transcript (620). Abstractive summary (610) and call transcript (620) are examples of abstractive summaries (118) and text data (110), respectively, of FIG. 1.

Figure 6B:
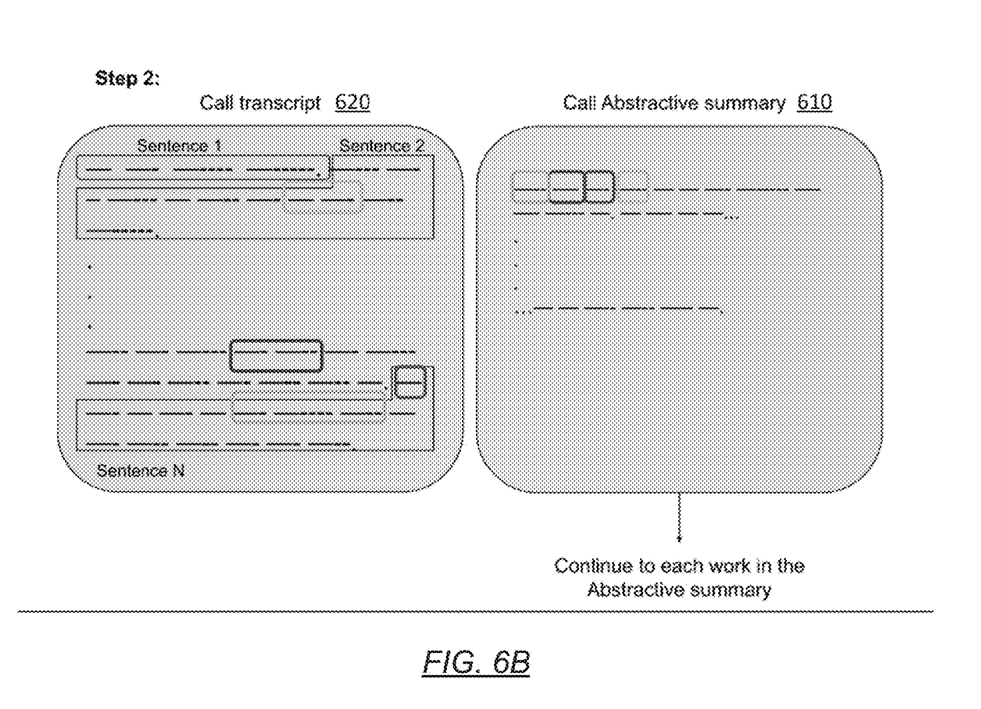

As illustrated in FIG. 6B, words of the input text are marked according to usage by the selected attention head when generating the abstractive summary. Collectively, the marked words comprise a portion ($P_i$) of the input text that is used by the respective head to generate the abstractive summary.

Figure 6C:
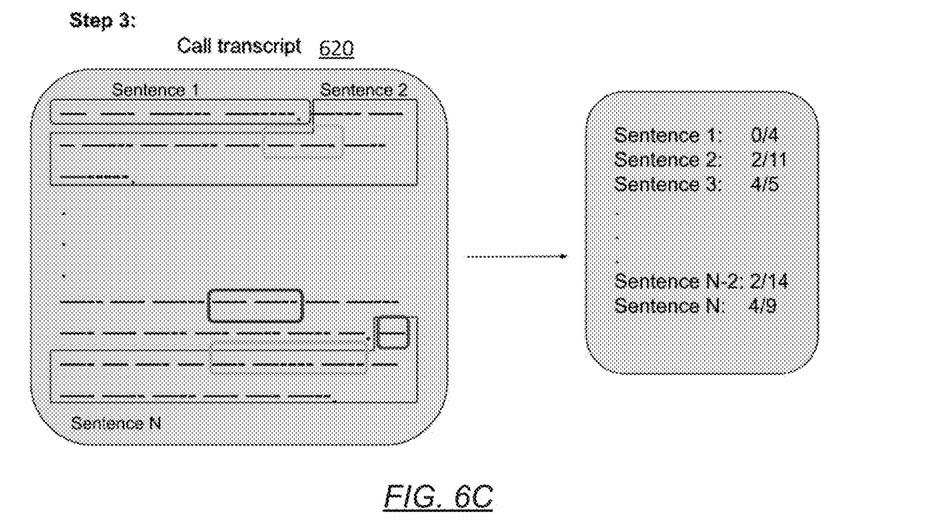

As illustrated in FIG. 6C, a fractional size (F) calculated for each sentence ($S_j$) of the input text. In other words, for each sentence in the input text, calculate the percentage of words that were used by the head to generate the summary. The fractional size (F) can be calculated as an intersection of the portion and the respective sentence relative to the respective sentence as illustrated in Equation 1. In other words, the fractional size (F) for a respective sentence ($S_j$) is a percentage (i.e., fractional number) of words in respective sentence ($S_j$) that are used by the attention head to generate portion ($P_i$).

In the example of FIG. 6C, sentence 1 ($S_j$) has four words, none of which are used in generating the abstract summary. Thus, the fractional size ($F_{S1}$) of sentence 1 ($S_1$) is zero (i.e., 0/4). Sentence 2 ($S_2$) has 11 words, two of which are used in generating the abstract summary. Thus, the fractional size ($F_{S2}$) of sentence 2 ($S_2$) is 0.18 (i.e., 2/11). Continuing to the additional sentences, the fractional size ($F_{S3}$) of sentence 3 ($S_3$) is 0.8 (i.e., 4/5) the fractional size ($F_{SN-2}$) of sentence N-2 ($S_{N-2}$) is 0.14 (i.e., 2/14), and the fractional size ($F_{SN}$) of sentence N ($S_N$) is 0.44 (i.e., 4/9).

Figure 6D:
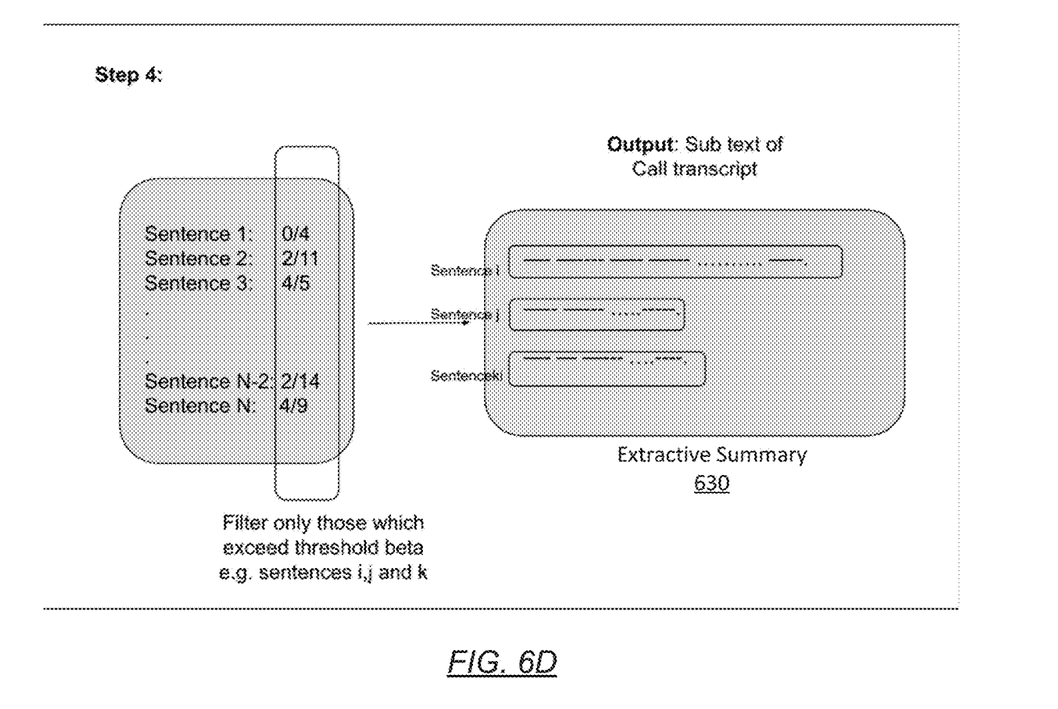

As illustrated in FIG. 6D, a subset of the sentences $\{s_k \in S_j\}$ is identified for generating the extractive summary (630). The respective fractional size (F) of each sentence in the subset meets a threshold value. sentences with percentage above the threshold are extracted, and their serial concatenation makes up the extractive summary (630).

The extractive summary (630) is then provided as output, which in this example can be a summary of the customer service call transcript (620). Once generated, both the abstractive summary (610) and the extractive summary (630) can be stored and associated with the transcription in a data repository. The collection of documents can then be accessed in a quality assurance system for training of customer service agents.

Figure 7A:
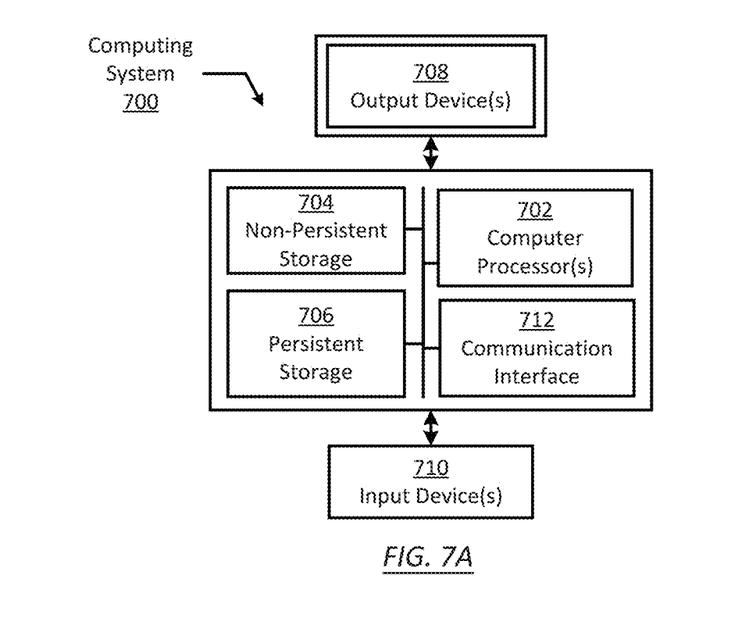
FIG. 7A and FIG. 7B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (708) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 7B:
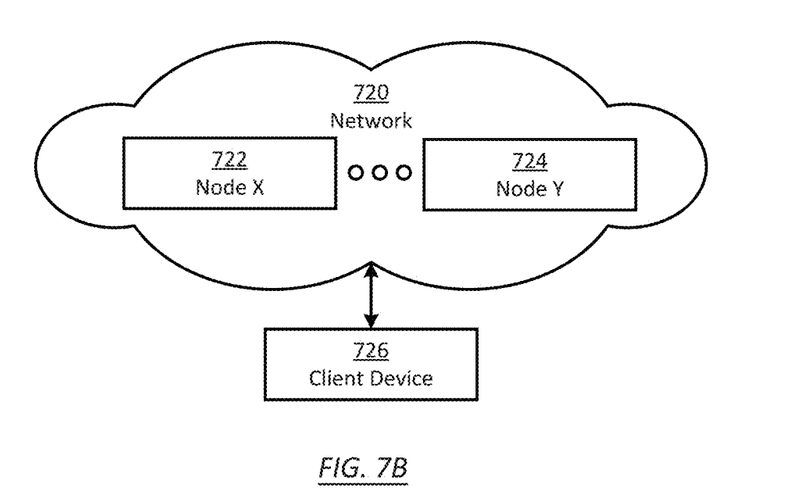

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments of the invention.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method for generating a text summary, the method comprising:
   processing an input text by a model that comprises a set of attention heads, wherein the model is trained to generate abstractive summaries of text documents;
   identifying a subset of the attention heads;
   for each attention head in the subset, identifying a portion from the input text that is used to generate the abstractive summary;
   for each sentence of the input text, calculating a fractional size of an intersection of the portion and the respective sentence relative to the respective sentence;
   determining a subset of the sentences, wherein the respective fractional size of each sentence in the subset meets a first threshold; and
   generating an extractive summary of the input text from the subset of sentences.

2. The method of claim 1, wherein the model is trained on a dataset suitable that has been curated for abstractive summary generation.

3. The method of claim 1, wherein the fractional size of the intersection is a percentage of words in respective sentence that appear in the portion.

4. The method of claim 1, wherein identifying the subset of the attention heads further comprises:
   identifying a respective weight applied by the model to each attention head, wherein each weight is determined during training of the model; and
   identifying an attention head as a member of the subset when the respective weight meets a second threshold.

5. The method of claim 1, wherein generating an extractive summary further comprises:
   serially concatenating the subset of sentences identified from the input text to generate the extractive summary.

6. The method of claim 1, further comprising:
   generating an abstractive summary of the input text, wherein both the extractive summary and the abstract of summary are generated from a single model trained from a single data set.

7. The method of claim 1, wherein the input text is a transcription of a customer service call, where in the extractive summary comprises one or more sentences extracted from the transcription.

8. The method of claim 7, further comprising:
generating an abstractive summary of the input text, wherein both the extractive summary and the abstract of summary are generated from a single model trained from a single data set; and
storing both the abstractive summary and the extractive summary associated with the transcription in a quality assurance system for training of customer service agents.

9. A system comprising:
a model that comprises a set of attention heads, wherein the model is trained to generate abstractive summaries of text documents;
an application executing on one or more servers and configured for:
processing an input text by the model;
identifying a subset of the attention heads;
for each attention head in the subset, identifying a portion from the input text that is used to generate the abstractive summary;
for each sentence of the input text, calculating a fractional size of an intersection between the portion and the respective sentence relative to the respective sentence;
determining a subset of the sentences, wherein the respective fractional size of each sentence in the subset meets a first threshold; and
generating an extractive summary of the input text from the subset of sentences.

10. The system of claim 9, wherein the model is trained on a dataset suitable that is curated for abstractive summary generation.

11. The method of claim 9, wherein the fractional size of the intersection is a percentage of words in respective sentence that appear in the portion.

12. The system of claim 9, wherein identifying the subset of the attention heads further comprises:
identifying a respective weight applied by the model to each attention head, wherein each weight is determined during training of the model; and
identifying an attention head as a member of the subset when the respective weight meets a second threshold.

13. The system of claim 9, wherein generating an extractive summary further comprises:
serially concatenating the subset of sentences identified from the input text to generate the extractive summary.

14. The system of claim 9, further comprising:
generating an abstractive summary of the input text, wherein both the extractive summary and the abstract of summary are generated from a single model trained from a single data set.

15. The system of claim 9, wherein the input text is a transcription of a customer service call, where in the extractive summary comprises one or more sentences extracted from the transcription.

16. The system of claim 15, further comprising:
generating an abstractive summary of the input text, wherein both the extractive summary and the abstract of summary are generated from a single model trained from a single data set; and
storing both the abstractive summary and the extractive summary associated with the transcription in a quality assurance system for training of customer service agents.

17. A system comprising:
an application executing on one or more client devices and configured for:
sending an input text to a server application, where in the server application is configured for:
processing an input text by a model that comprises a set of attention heads, wherein the model is trained to generate abstractive summaries of text documents;
identifying a subset of the attention heads;
for each attention head in the subset, identifying a portion from the input text that is used to generate the abstractive summary;
for each sentence of the input text, calculating a fractional size of an intersection between the portion and the respective sentence relative to the respective sentence;
determining a subset of the sentences, wherein the respective fractional size of each sentence in the subset meets a first threshold; and
generating an extractive summary of the input text from the subset of sentences; and
receiving the executive summary in a response from the server application.

18. The system of claim 17, wherein the model is trained on a dataset suitable that is curated for abstractive summary generation.

19. The method of claim 17, wherein the fractional size of the intersection is a percentage of words in respective sentence that appear in the portion.

20. The system of claim 17, wherein identifying the subset of the attention heads further comprises:
identifying a respective weight applied by the model to each attention head, wherein each weight is determined during training of the model; and
identifying an attention head as a member of the subset when the respective weight meets a second threshold.

21. The system of claim 17, wherein generating an extractive summary further comprises:
serially concatenating the subset of sentences identified from the input text to generate the extractive summary.

22. The method of claim 17, further comprising:
generating an abstractive summary of the input text, wherein both the extractive summary and the abstract of summary are generated from a single model trained from a single data set.

23. The system of claim 17, wherein the input text is a transcription of a customer service call, where in the extractive summary comprises one or more sentences extracted from the transcription.

24. The system of claim 23, further comprising:
generating an abstractive summary of the input text, wherein both the extractive summary and the abstract of summary are generated from a single model trained from a single data set; and
storing both the abstractive summary and the extractive summary associated with the transcription in a quality assurance system for training of customer service agents.

\* \* \* \* \*